(12) United States Patent
Kurtz et al.

(10) Patent No.: US 6,366,403 B1
(45) Date of Patent: Apr. 2, 2002

(54) LASER IMAGE CONTRAST ENHANCEMENT SYSTEM

(75) Inventors: Robert L. Kurtz, New Market; Richard R. Holmes, Guntersville; William K. Witherow, Huntsville, all of AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/782,460

(22) Filed: Feb. 12, 2001

(51) Int. Cl.[7] .................................................. G02B 5/30
(52) U.S. Cl. ........................ 359/487; 359/497; 359/502; 250/216
(58) Field of Search .................................. 359/485, 487, 359/495, 497, 502; 250/216; 356/445, 448; 382/274

(56) References Cited

U.S. PATENT DOCUMENTS 5,202,744 A * 4/1993 Louis .......................... 359/502
5,781,304 A * 7/1998 Kotidis et al. ............. 356/432 T

* cited by examiner

*Primary Examiner*—Darren Schuberg
(74) *Attorney, Agent, or Firm*—James J. McGroary

(57) ABSTRACT

An optical image enhancement system provides improved image contrast in imaging of a target in high temperature surroundings such as a furnace. The optical system includes a source of vertically polarized light such as laser and a beam splitter for receiving the light and directing the light toward the target. A retardation plate is affixed to a target-facing surface of the beam splitter and a vertical polarizer is disposed along a common optical path with the beam splitter between the retardation plate and the target. A horizontal polarizer, disposed in the common optical path, receives light passing through a surface of the beam splitter opposed to the target-facing surface. An image detector is disposed at one end of the optical path. A band pass filter having a band pass filter characteristic matching the frequency of the vertically polarized light source is disposed in the path between the horizontal polarizer and the image detector. The use of circular polarization, together with cross polarizers, enables the reflected light to be passed to the detector while blocking thermal radiation.

20 Claims, 2 Drawing Sheets

LASER IMAGE CONTRAST ENHANCEMENT SYSTEM

ORIGIN OF THE INVENTION

Figure 1:
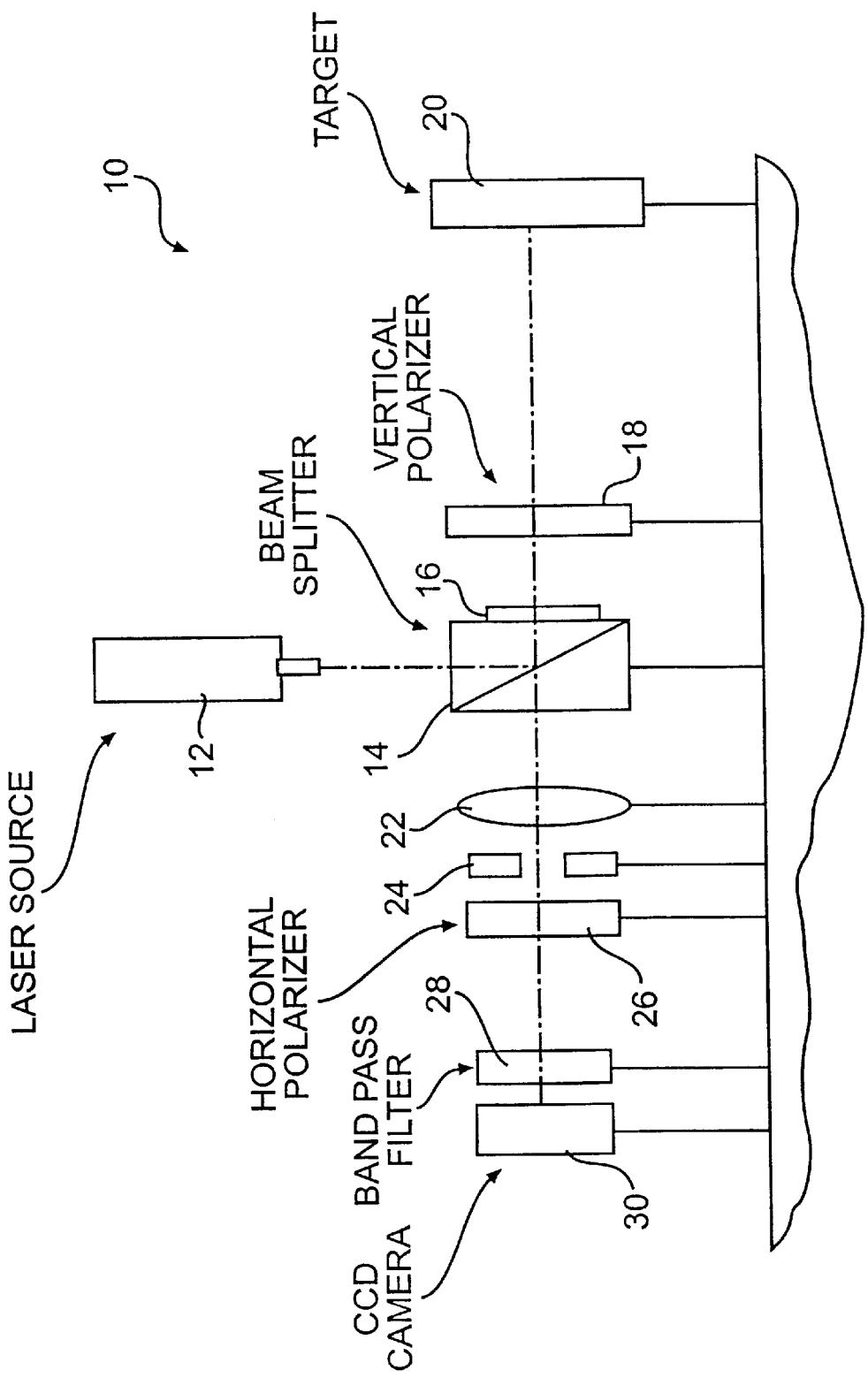

This invention was made by employees of the United States Government and may be manufactured and used by or for the Government for Governmental purposes without the payment of royalties.

BACKGROUND OF THE INVENTION (1) Field of the Invention

The present invention relates to imaging at high temperatures and, more particularly, to an image contrast and enhancement system that enables imaging of a sample in a furnace or the like in a manner providing discernible contrast between the sample and the surroundings thereof.

(2) Description of the Related Art

Stephen's Law of Radiation provides that radiation from a high temperature source increases by a factor of sixteen with each doubling of the temperature. As a consequence, in a furnace wherein the temperature is about 1500 degrees Centigrade or above, everything radiates as a "black body," i.e., at an extremely high illumination of light. Accordingly, at these temperatures all items in the furnace look alike, i.e., there is no discernible contrast between the items.

In the process of sintering of a sample (made of, e.g., tungsten, nickel, iron, copper or the like) in a high temperature furnace, sample morphology of considerable interest and thus the contrast between the sample and the sample surroundings is of utmost importance.

One known device for obtaining high contrast images in a very high temperature environment is sold under the name PYROCAM by Control Vision Inc. The device uses a high intensity Xenon flash lamp that produces a five microsecond pulse and employs a bandpass filter to permit only the blue line of Xenon flash lamp to be used in obtaining the images. A digital process is used to provide further image enhancement. One disadvantage of the device is that the device operates off axis, i.e., the incident beam forms a small angle with the received beam. In addition, a relatively large opening (at least three inches in diameter) is required.

SUMMARY OF THE INVENTION

According to the invention, an image enhancement system is provided which affords greatly improved image contrast in images of a target in a high temperature environment such as a furnace or the like. Moreover, in contrast to the PYROCAM device, the invention provides an on-axis, monostatic mode of operation that permits the system of the invention to interface with a much smaller opening. Further, the overall device can be made quite small and compact.

In accordance with the invention, there is provided an image enhancement system for providing image contrast in an image of target and its surroundings in a high temperature environment, the system comprising: a light source for producing a light beam; circular polarizing means for circularly polarizing said light beam to produce a circularly polarized light beam directed along an optical path toward said target so as to be reflected by the target and its surroundings; a first linear polarizer disposed in the optical path between said circular polarizing means and the target through which said circularly polarized light beam passes in a first direction which traveling to the target and through which the circularly polarized light beam passes in a second, opposite direction, along with thermal radiation from the target and its surroundings, after being reflected and reversed in polarization by the target and its surroundings; and a second linear polarizer disposed in the optical path downstream of the circular polarizing means and providing polarization of light received thereby which is orthogonal to the polarization provided by said first polarizer, the circular polarizing means converting the reflected and polarization reversed, circularly polarized light received from said first polarizer into light of the same polarization as that provided by the second polarizer so that the second polarizer passes the light received from said circular polarizing means while blocking said thermal radiation so as to provide a high contrast image of the target.

Preferably, the circularly polarizing means comprises a quarter wave retardation plate. The system preferably further comprises a beam splitter disposed in the common optical path for receiving the light beam from the light source, for directing the received light beam along the light path toward the target and for passing said reflected light beam to the second polarizer. Advantageously, the quarter wave retardation plate is mounted on a target-facing surface of the beam splitter. Preferably, the beam splitter comprises a polarizing cubic beam splitter.

In a preferred implementation, a band pass filter is disposed along the optical path downstream of the circular polarizing means which has a band pass filter characteristic matching the frequency of the light beam produced by the light source.

Advantageously, a charge coupled device camera is positioned along the optical path for capturing the high contrast image.

Preferably, a field aperture is positioned along the optical path between the circular polarizing means and the second polarizer. Advantageously, a lens is positioned between the circular polarizing means and the field aperture along the optical path.

In an advantageous implementation, the light source comprises a source of vertically polarized light, and the first polarizer comprises a vertical polarizer and the second polarizer comprises a horizontal polarizer.

In a preferred embodiment, the light source comprises a laser light source.

In accordance with a further aspect of the invention, there is provided an optical image enhancement system for providing image contrast in an image of a target in high temperature surroundings, the optical system comprising: a source of vertically polarized light; a beam splitter for receiving said light and directing the light toward the target; a retardation plate affixed to a target-facing surface of the beam splitter; a vertical polarizer disposed along a common optical path with said beam splitter between the retardation plate and the target; a horizontal polarizer disposed in the common optical path for receiving light passing through a surface of said beam splitter opposed to said target-facing surface; an image detector disposed at one end of the common optical path; and a band pass filter disposed in the common optical path between the horizontal polarizer and the image detector and having a band pass filter characteristic matching the frequency of the vertically polarized light source.

Advantageously, the beam splitter comprises a cubic polarizing beam splitter. Preferably, the system further comprises a field aperture disposed in the common optical path between the beam splitter and the second polarizer. Advantageously, a lens is positioned between the beam splitter and said field aperture.

The image detector preferably comprises a charge coupled device camera.

The light source preferably comprises a laser.

Further features and advantages of the present invention will be set forth in, or apparent from, the detailed description of preferred embodiments thereof which follows.

BRIEF DESCRIPTION OF THE DRAWING FIGURES

Figure 2:
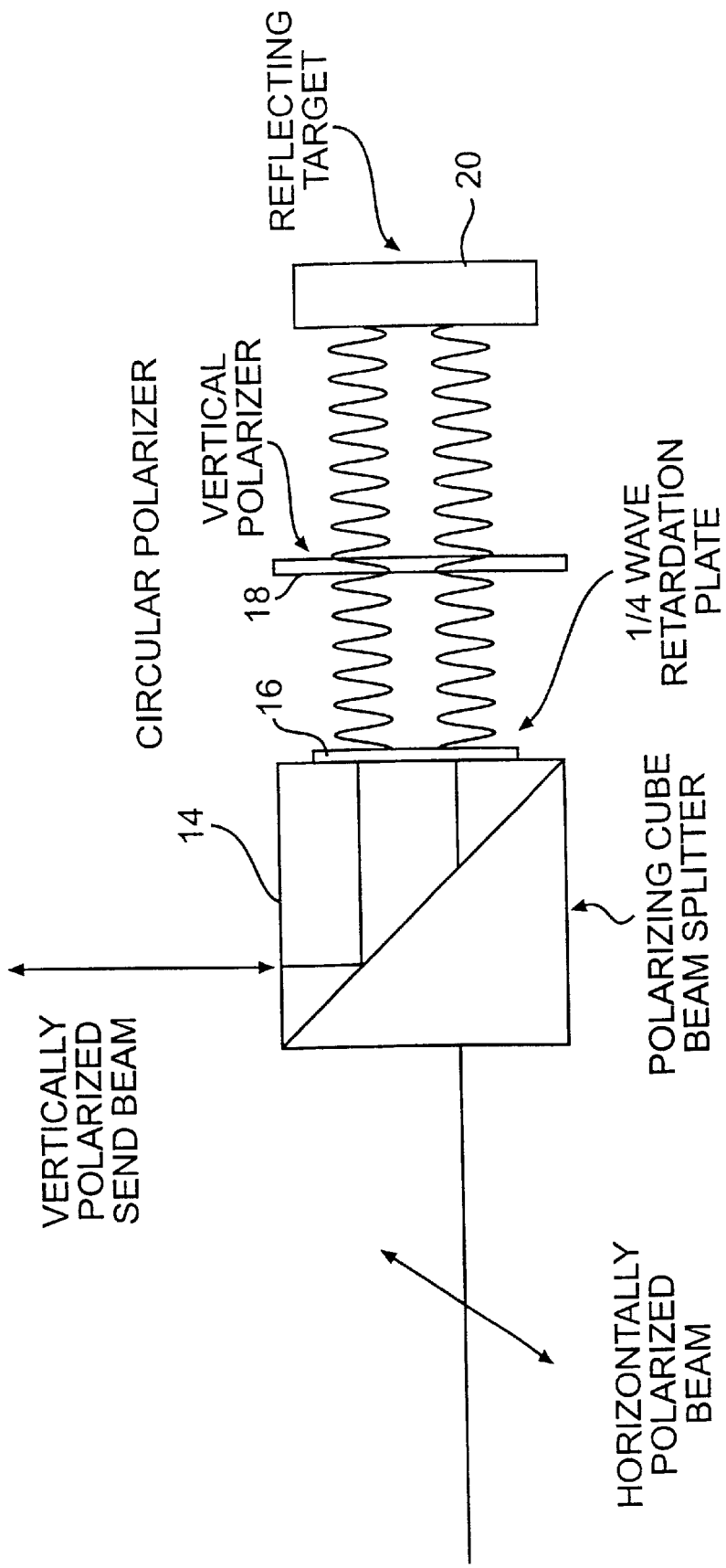

FIG. 1 is a schematic side elevational view of the basic optical arrangement of an image enhancement system in accordance with a preferred embodiment of the invention; and FIG. 2 is a schematic side elevational view of a portion of the system of FIG. 1, showing the circularly polarized reflecting target.

DETAILED DESCRIPTION OF THE PREFERRED EMBODIMENTS

Referring to FIG. 1, there is provided a schematic representation of the optical components of a light image enhancement system in accordance with a preferred embodiment of the invention. The system, which is generally denoted 10, includes a vertically polarized light source 12, shown here as a laser source, which produces a vertically polarized light (laser) beam which is made incident on a cubic polarizing beam splitter 14 where the beam is almost totally reflected. It will be understood that a polarizing cube beam splitter reflects vertically polarized light and transmits horizontally polarized light. Upon reflection in beam splitter 14, the light beam is passed through a quarter wave retardation plate 16 which is affixed to beam splitter 14 and which converts the beam into a circularly polarized beam. The fast axis of the plate 16 is disposed so as to form a 45° axis with respect to the vertical. In the specific example under consideration, the beam is left circular polarized.

A linear polarizer 18 oriented to transmit vertically polarized light is positioned between the retardation plate 16 and a target 20 disposed in the depths of a furnace (not shown). The circularly polarized beam passes through the linear (vertical) polarizer 18 undisturbed onto the target 20, i.e., the linear polarizer 18 has no effect on the left circular polarized light. The left circular polarized light enters the furnace (not shown) and is reflected off of target 20. Upon reflection, the circular polarization of the beam is reversed (e.g., from left-hand to right-hand rotation) and the right circular polarized reflected light from target 20 passes undisturbed back through the linear polarizer 18 during the travel thereof to quarter wave plate 16.

Also coming from the furnace is unpolarized light that is created by blackbody radiation from the heated furnace. The unpolarized light is converted into vertically polarized light as it passes through linear (vertical) polarizer 18.

After passing through linear polarizer 18, the reflected polarized light beam is incident on the quarter wave plate 16 which converts the left-hand circular polarized light into horizontally polarized light.

The circular polarization of the light beam can perhaps be better understood from FIG. 2 wherein vertically polarized radiation, i.e., a vertically polarized send beam, is incident on the cubic beam splitter 14 in which the radiation is reflected and passed through the quarter wave retardation plate 16. This retardation causes the vertically polarized radiation to be circularly polarized. The circularly rotating beam is incident on the reflection target 20 and, as described above, the direction of the beam is reversed and the beam is returned to beam splitter 14. The quarter wave plate 16 converts the incoming circularly polarized light into horizontally polarized light so that when incident on the splitter 14, the horizontal component passes therethrough. On the other hand, the quarter wave plate 16 converts the vertically polarized light from the furnace into left circular polarized light which is transmitted by beam splitter 14.

Referring again to FIG. 1, a lens 22, a field aperture 24 and a second linear (horizontal) polarizer 26 are disposed to receive the light from beam splitter 14. Light from the reflected laser beam and from the furnace passes through the lens 22 and the field aperture 24 and becomes incident on the horizontal polarizer 26. Basically, horizontal linear polarizer 26 passes the reflected laser light and blocks the reflected thermal light from the furnace. More specifically, the horizontally polarized light beam passes through the horizontal polarizer 26. However, the left circular polarized light from the furnace is decreased in intensity as it passes through horizontal linear polarizer 26.

A bandpass filter 28 is used to match the chosen light line source and blocks everything above and below the filter passband. Thus the thermal light from the furnace is further decreased in intensity. The light is finally incident on a light detector, shown here in the form of a charge coupled device (CCD) camera 30, the output of which is the enhanced image.

It will be appreciated that the extinction ratios of the polarizers 18 and 26 are not 100% so that a small percentage of the thermal radiation does get through the system. As the furnace temperature becomes higher and higher, the total amount of thermal photons correspondingly increases and the small percentage allowed through the system also correspondingly increases. As a consequence, in order to retain increased image contrast, the amount of incident laser light input into the system 10 must be slightly increased as the temperature of the furnace increases above about 1200° to 1300° C.

It will be appreciated that the use of circular polarization, as described above, permits the use of both vertical and horizontal polarizers (corresponding to polarizers 18 and 26). The presence of both vertical and horizontal polarizers 18 and 26 in the beam of radiation does not alter the laser radiation but does provide cross polarization for blocking the thermal radiation originating in the furnace. The cross polarizers 18 and 26 are used to block in excess of 90% of the thermal radiation from the furnace. This blocking function, along with the bandpass filtering provided by filter 28, blocks most of the radiation from the furnaces. It will be understood that by blocking the thermal radiation and only passing the laser line radiation, the system 10 enables high contrast images to be produced at and to be recorded by CCD camera 30.

Although the light source 12 is described above as being a laser, other light sources of any different desirable wavelength can be used. Of course, the wavelength chosen must match that of the bandpass filter 28.

Although the present invention is obviously not limited to such an application, a specific application will now be considered wherein there are volume restrictions as explained below. In this example, inspection was required of a ten mm by ten mm target placed at approximately thirty inches inside of a furnace through a cylinder of approximately one-half inch diameter having an optical window at the entrance. This assembly is referred to as a "cartridge" and all of the optical components shown in FIG. 1 were included in a cap, referred to as the cartridge "head," that fits over the head of the cartridge. The size of the "head" is limited in volume and in this example, had a volume of 20 cubic inches. In this example, a turbovacuum pump was used to evacuate the cartridge. The maintenance required is largely dependent on the environment to which the device is subjected and principally involves maintaining the optical alignment of the optical components in the cartridge head. The degree of alignment is of the order of a few arc seconds and the reliability of the system is high if alignment is maintained.

As indicated previously, in contrast to the PYROCAM device described above, the present invention provides an on-axis, monostatic mode operation that permits the system of the invention to interface with a much smaller opening. In this regard, as indicated above, the system has been used with an opening of approximately one-half inch, in contrast to the opening of at least three inches in diameter required by the PYROCAM device. Further, the overall size of the system of the invention can be made quite small as indicated in the description above of a specific, non-limiting example.

In an alternative embodiment, both of the two linear polarizers 18 and 26 are placed between the quarter wave plate 16 and furnace (target 20). One linear polarizer would be oriented to pass horizontally polarized light and the second linear polarizer would be oriented to pass vertically polarized light, as described above. In this embodiment, the light path would be the same for the laser light as the light is passed from the laser to the furnace, reflected from the furnace, and passed on to the camera 30. The blackbody radiation that is generated from the furnace would be vertically polarized by the first linear polarizer and substantially completely blocked by the second polarizer.

Although the invention has been described above in relation to preferred embodiments thereof, it will be understood by those skilled in the art that variations and modifications can be effected in these preferred embodiments without departing from the scope and spirit of the invention.

What is claimed is:

1. An image enhancement system for providing image contrast in an image of target and its surroundings in a high temperature environment, said system comprising:
   a light source for producing a light beam;
   circular polarizing means for circularly polarizing said light beam to produce a circularly polarized light beam directed along an optical path toward said target so as to be reflected by the target and its surroundings;
   a first linear polarizer disposed in said optical path between said circular polarizing means and the target through which said circularly polarized light beam passes in a first direction which traveling to the target and through which the circularly polarized light beam passes in a second, opposite direction, along with thermal radiation from the target and its surroundings, after being reflected and reversed in polarization by the target and its surroundings; and
   a second linear polarizer disposed in said optical path downstream of said circular polarizing means and providing polarization of light received thereby which is orthogonal to the polarization provided by said first polarizer,
   said circular polarizing means converting the reflected and polarization reversed, circularly polarized light received from said first polarizer into light of the same polarization as that provided by the second polarizer so that the second polarizer passes the light received from said circular polarizing means while blocking said thermal radiation so as to provide a high contrast image of the target.

2. A system in accordance with claim 1 wherein said circularly polarizing means comprises a quarter wave retardation plate.

3. A system in accordance with claim 2 wherein said system further comprises a beam splitter disposed in said optical path for receiving said light beam from said light source, for directing the received light beam along said light path toward said target and for passing said reflected light beam to said second polarizer.

4. A system in accordance with claim 3 wherein said quarter wave retardation plate is mounted on a target-facing surface of said beam splitter.

5. A system in accordance with claim 4 wherein said beam splitter comprises a polarizing cubic beam splitter.

6. A system in accordance with claim 4 further comprising a band pass filter disposed along said optical path downstream of said circular polarizing means and having a band pass filter characteristic matching the frequency of the light beam produced by said light source.

7. A system in accordance with claim 6 further comprising a charge coupled device camera positioned along said light path for capturing said high contrast image.

8. A system in accordance with claim 7 further comprising a field aperture positioned along said optical path between said circular polarizing means and said second polarizer.

9. A system in accordance with claim 8 further comprising a lens positioned between the circular polarizing means and said field aperture along said optical path.

10. A system in accordance with claim 1 further comprising a band pass filter disposed along said optical path downstream of said circular polarizing means and having band pass filter characteristic matching the frequency of the light beam produced by said light source.

11. A system in accordance with claim 1 further comprising a charge coupled device camera positioned along said optical path for capturing said high contrast image.

12. A system in accordance with claim 1 further comprising a field aperture positioned along said optical path between said circular polarizing means and said second polarizer.

13. A system in accordance with claim 1 wherein said light source comprises a source of virtually polarized light, wherein said first polarizer comprises a vertical polarizer and said second polarizer comprises a horizontal polarizer.

14. A system in accordance with claim 1 wherein light source comprises a laser light source.

15. An optical image enhancement system for providing image contrast in an image of a target in high temperature surroundings, said optical system comprising:
   a source of vertically polarized light;
   a beam splitter for receiving said light and directing the light toward a target;
   a retardation plate affixed to a target-facing surface of the beam splitter;
   a vertical polarizer disposed along a common optical path with said beam splitter between the retardation plate and the target;
   a horizontal polarizer disposed in said common optical path for receiving light passing through a surface of said beam splitter opposed to said target-facing surface;
   an image detector disposed at one end of said common optical path; and a band pass filter disposed in said common optical path between said horizontal polarizer and said image detector and having a band pass filter characteristic matching the frequency of the vertically polarized light source.

16. A system in accordance with claim 15 wherein said beam splitter comprises a cubic polarizing beam splitter.

17. A system in accordance with claim 15 further comprising a field aperture disposed in said common optical path between said beam splitter and said second polarizer.

18. A system in accordance with claim 15 further comprising a lens positioned between the beam splitter and said field aperture.

19. A system in accordance with claim 15 wherein said image detector comprises a charge coupled device camera.

20. A system in accordance with claim 15 wherein said light source comprises a laser.

* * * * *